United States Patent [19]

Hegarty et al.

[11] 4,449,994
[45] * May 22, 1984

[54] LOW ENERGY PROCESS FOR SEPARATING CARBON DIOXIDE AND ACID GASES FROM A CARBONACEOUS OFF-GAS

[75] Inventors: William P. Hegarty, Wescosville; William P. Schmidt, Allentown, both of Pa.

[73] Assignee: Air Products and Chemicals, Inc., Allentown, Pa.

[*] Notice: The portion of the term of this patent subsequent to Nov. 29, 2000 has been disclaimed.

[21] Appl. No.: 339,359

[22] Filed: Jan. 15, 1982

[51] Int. Cl.³ .............................................. F25J 3/00
[52] U.S. Cl. .......................................... 62/17; 55/68; 55/73; 62/28; 62/31; 62/34; 62/39
[58] Field of Search .................... 62/39, 9, 11, 19, 37, 62/33, 34, 23, 24, 31, 28, 17, 20; 55/73, 55, 68; 208/11 R; 48/196 R, 196 FM, 197 R, 197 FM, 215, DIG. 6

[56] References Cited

U.S. PATENT DOCUMENTS

| | | | |
|---|---|---|---|
| 2,886,405 | 5/1959 | Benson et al. | 23/3 |
| 3,130,026 | 4/1964 | Becker | 62/24 |
| 3,224,954 | 12/1965 | Schlinger et al. | 208/11 |
| 3,565,784 | 2/1971 | Schlinger et al. | 208/11 |
| 3,703,052 | 11/1972 | Linden | 48/215 |
| 3,966,583 | 6/1976 | Cramer | 208/8 |
| 4,014,575 | 3/1977 | French et al. | 299/2 |
| 4,043,897 | 8/1977 | Deering | 208/11 |
| 4,075,081 | 2/1978 | Gregoli | 208/11 |
| 4,117,886 | 10/1978 | Honaker | 166/259 |
| 4,158,467 | 6/1979 | Larson et al. | 43/24 |
| 4,166,786 | 9/1979 | Duraiswamy et al. | 208/8 |
| 4,169,133 | 9/1979 | Staege | 423/437 |
| 4,169,506 | 10/1979 | Berry | 166/256 |
| 4,243,511 | 1/1981 | Allred | 208/11 |
| 4,263,970 | 4/1981 | Cha | 166/261 |
| 4,270,937 | 6/1981 | Adler et al. | 62/17 |

FOREIGN PATENT DOCUMENTS

77/7157 12/1977 South Africa.
2069118 8/1981 United Kingdom.

OTHER PUBLICATIONS

Reginald I. Berry, 'Heavy Oil–An Untapped Find', Chemical Engineering Jul. 30, 1979, pp. 25–27.
R. E. Meissner III, 'Purify $CO_2$ for Use', Hydrocarbon Processing, Apr. 1980, pp. 113–116.
'Bright Prospects Loom for Used-Oil Rerefiners', Chemical Engineering, Jul. 30, 1979, p. 28.
M. A. Hasanain et al., 'Sorption of $SO_2$ on Spent Shale in Packed Beds', Environmental Aspects of Shale Oil Prod. & Proc., pp. 416–421.
Leslie E. Compton et al., 'Hydrogen Sulfide Removal from Retort Offgasses Using Oil Shale', Environmental Aspects of Shale Oil Prod. & Proc., pp. 422–429.

Primary Examiner—Frank Sever
Attorney, Agent, or Firm—Geoffrey L. Chase; E. Eugene Innis; James C. Simmons

[57] ABSTRACT

A process is disclosed for the separation of carbon dioxide and sulfide gases from oil shale retort off-gases, coal gasification off-gases, oxygen fire-flooding or carbon dioxide miscible flood enhanced oil recovery off-gases for recycle to a retort, gasifier or petroleum reservoir or alternately delivery to another process. The process separates the off-gases into an essentially sulfur-free fuel gas and an acid gas for recycle to such a retort, gasifier or reservoir wherein the off-gas is compressed if necessary and cooled to separate the two streams, the acid gas is expanded in an auto refrigeration step to provide the necessary process refrigeration and the acid gas is then recycled to such a retort, gasifier or reservoir. In the oil shale retorting and coal gasification applications, the gas' sulfur constituents are sorbed on spent oil shale particles or coal ash.

23 Claims, 2 Drawing Figures

FIG. I

LOW ENERGY PROCESS FOR SEPARATING CARBON DIOXIDE AND ACID GASES FROM A CARBONACEOUS OFF-GAS

TECHNICAL FIELD

The present invention is directed to the field of recycling of off-gas streams from various synthetic fuels and synthetic gas production processes, such as: oil shale retorting, coal gasification, oxygen fireflooding and enhanced oil recovery operations. The process of the present invention is directed to the recycling of carbon dioxide as a diluent for an oxidant gas introduced into a retort, either surface or in-situ and to the deposition of sulfur components contained in the off-gases from such retorting back onto the residue of the retorting operation. The process is further directed to the recovery of a low sulfur, low BTU fuel gas from the off-gas streams from the retorting operation. The process is also applicable to treating off-gas from oxygen in-situ combustion or carbon dioxide miscible flood enhanced oil recovery operations to recover carbon dioxide for recycle or export.

BACKGROUND OF THE PRIOR ART

Oil shale is a sedimentary geologic formation generally found in the western states of the United States. The oil shale contains a hydrocarbonaceous component called kerogen. By mining the oil shale and heating it in a retort, the kerogen component is liquified and can be recovered for refining into an oil product similar to petroleum oil products. The retorting of oil shale can be conducted in a surface retort vessel which is fed with traditionally mined, particulate oil shale, or in in-situ retorts wherein the oil shale is blasted into a concise rubble pattern within its geologic formation, in which the formation forms the retort itself. The particulate or rubble oil shale is then ignited by the combustion of a gas forced through the retort. A portion of the oil shale is burned during the heating operation in which that amount of the kerogen is also lost. However, as the unsteady state, batch retorting process progresses, the hot combustion product gases pass down through the shale, heating it and retorting it to drive out gas and oil vapor products that are carried out with the combustion products and cooled. The retorted shale contains residual carbon that sustains the burn as retorting progresses downward. This heat and combustion process requires a sustained flow of oxygen gas but only an initial flow of fuel gas. With air as the typical oxidant, a diluent is required to moderate the peak combustion temperatures to avoid melting the shale to a slag and to avoid producing excessive energy consuming carbonate decomposition. Steam and carbon dioxide are known retort diluent gases. As a retort operation proceeds, substantial quantities of liquid hydrocarbon oil and off-gases are produced. The off-gases consisting of combustion products, oil shale volatiles and diluent gas are separated from the liquid phase and cleaned and vented or can be recycled. Various sulfur compounds such as hydrogen sulfide and carbonyl sulfide are found in the off-gases and are a problem to the proper disposal or use of the off-gases. It has been found that the sulfides can be absorbed onto the spent oil shale if the off-gas is recycled. Additionally, the recycled off-gas, when depleted of any BTU fuel components, can serve as an excellent moderator or diluent gas for combining with the oxidant feed, such as oxygen, to the retort as the combustion and heat inducing media.

In surface and in-situ combustion type coal gasification processes, moderators are typically added to the input air or oxygen. In surface gasifier retorts, steam has typically been used to hold peak temperature to levels where the ash will not slag. In in-situ coal gasification processes, steam has been added to avoid excessive temperatures with high heat losses into surrounding strata and to avoid burnout of the oxidant injection lance. Steam has the advantage that it is easily separated as condensate by cooling the gasifier effluent. It has the disadvantage that the condensate requires expensive treatment to remove contaminants and that energy requirements for steam generation are high. In the established Lurgi dry ash moving bed gasifier retort using steam and oxygen, the energy required for the steam is 3 to 4 times greater than required to supply the oxygen. Carbon dioxide has been proposed as a combustion moderator for coal gasification, but has not been widely used even though it has been potentially available for recycle from the gasifier effluent. High energy requirements of existing processes for separating the $CO_2$ for recycle have presumably discouraged its use.

In both methods, coal gasification and oil shale retorting, it is environmentally as well as economicaly beneficial to recycle the carbon dioxide off-gases as a diluent gas for the retort operation and to absorb any sulfur containing components from the off-gases onto the remaining combusted media, i.e. spent oil shale or coal ash by way of the separated and recycled diluent gas stream. This method avoids the costly preparation of steam diluent and provides greater selectivity than air mixture diluent, while at the same time taking advantage of the use of the remaining media to rid the process and the atmospheric environment of noxious sulfur contaminants such as sulfides in various forms.

Various prior art processes have been developed for the refinement and the recycling of the off-gas products of coal gasification and oil shale retorting, as generally described above, especially in-situ oil shale retorting. These prior art processes generally suffer from high energy consumption and a complexity of process apparatus which requires a high capital expenditure.

In U.S. Pat. No. 2,886,405, a process is disclosed for the separation of carbon dioxide and hydrogen sulfide from gas mixtures utilizing a chemical absorbent solvent, such as hot potassium carbonate. As is typical in chemical solvents, the enriched solvent is regenerated by a boiling and steam stripping operation. Such a regeneration is an energy intensive operation.

The prior art in U.S. Pat. No. 4,014,575 teaches that off-gases from oil shale retorting can be recycled through spent oil shale beds for the deposition of sulfur compounds from the off-gas onto the particles of the oil shale bed. This can be done in conjunction with the water scrubbing of the off-gases in a Venturi scrubber.

Another method has been utilized to scrub the off-gases from oil shale retorting wherein water containing basic components from an oil shale retort bed is contacted with the acid gas containing off-gas stream of an operating oil shale retort. The basic pH water neutralizes the acid off-gases and the latter can be recycled for retorting or burned if sufficient BTU energy can be derived. This process is described in U.S. Pat. No. 4,117,886.

In U.S. Pat. No. 4,158,467, a process for the recycling of oil shale retort off-gases is disclosed wherein the hot potassium carbonate solvent of U.S. Pat. No. 2,886,405 mentioned above, is utilized. As stated before, the utilization of chemical absorbent solvents in such an operation is energy intensive due to the complexity of regenerating such solvents for reuse. Additionally, the chemical absorption process is essentially non-selective, i.e. complete absorption of acidic sulfur compounds would be accompanied by complete absorption of contained $CO_2$.

The removal of acid gas components from gas streams is discussed in U.S. Pat. No. 4,169,133 wherein the carbon dioxide acid gas component is frozen out of the main gas stream. A process wherein a solid product is produced from a gas clean-up operation is not conducive to the recycling of such a component, such as in the present invention.

In U.S. Pat. No. 4,169,506, the scrubbing of off-gases from in-situ retorting of oil shale is set forth. The scrubbing utilizes caustic soda in conjunction with a deoiling process. In this instance, the scrubbed sulfur components are passed to a Claus plant for refinement to elemental sulfur.

In South African Published Application Ser. No. 77/7157 of Dec. 1, 1977 a process is disclosed for the separate removal of sulfides and carbon dioxide from a coal gasification gas stream. Externally supplied refrigeration is necessary to operate a complex solid/liquid absorbent stream in a process which operates on carbon dioxide containing streams in the 55% carbon dioxide range. Corresponding U.S. Pat. No. 4,270,937 of June 2, 1981 discloses similar subject matter.

The attempts by the prior art to solve the problems of economical provision of a diluent gas for the injected oxidant and handling of significant quantities of off-gas generated in oil shale retorting and coal gasification, whether these operations are undertaken in-situ or in external surface retorts are deficient for a number of reasons, including: the energy intensive nature of their scrubbing recovery operations, the necessity for regeneration of chemical solvents by steam stripping operations and the need for large quantities of water for scrubbing operations in retorting locations which may be deficient in adequate water resources to make such recovery systems operational.

The present invention overcomes these obstacles by providing a low energy, low temperature or cryogenic system for the recovery of recyclable gases from the off-gases of carbonaceous combustion retorting, such as oil shale and coal gasification retorting. The present invention achieves this recovery of recyclable gases such as carbon dioxide and acidic sulfide gases, either by cryogenics (low temperature) individually, or cryogenics and physical absorbent solvents used in conjunction with one another. The physical absorbent solvents are regenerated in a low energy process as compared to the chemical absorbent solvents of the prior art. Furthermore, the present invention process does not require the utilization of potentially scarce and valuable water resources at the site of the retorting operation.

The carbon dioxide separation and recycle of this invention is also useful in carbon dioxide miscible flood enhanced oil recovery operations. In this type of operation, carbon dioxide under high pressure is injected into an injection well to pressurize and lower the viscosity of oil formations which require pressure maintenance or secondary recovery in order to achieve economic production. High pressure carbon dioxide brings oil into solution and pushes oil toward the production well. As pressure is reduced at the surface of the production well, oil is separated as a liquid phase from carbon dioxide and oil derived contaminants in a gas phase. This gas phase can be introduced into the process of the present invention.

In oxygen fireflooding, a tertiary form of enhanced oil recovery, an oxidant such as air or preferably oxygen is injected into an oil formation and combusted either spontaneously or by an ignition media. The combustion heats the subterranean oil to volatilize a portion thereof and coke the remaining portion. The coked portion sustains the burn in conjunction with the oxidant necessary to heat the oil formation for successful tertiary production. This subterranean combustion produces significant levels of carbon dioxide which can be processed by the process of the present invention and sent to other carbon dioxide utilizing processes, such as the former systems mentioned above.

BRIEF SUMMARY OF THE INVENTION

The present invention is directed to a process for separating a carbonaceous off-gas containing acid gases such as carbon dioxide, hydrogen sulfide and carbonyl sulfide by the separation of said off-gases into an essentially sulfur-free fuel gas and an acid gas stream for recycle or export. The process comprises the compression and aftercooling of an off-gas from a gas producing operation, the removal of any butane and higher boiling hydrocarbons in the gas by adsorption in lean solvent, the drying of the compressed and cooled off-gas to remove moisture from said gas, the subcooling of the off-gas against various product gas streams in a heat exchanger, the separation of the subcooled off-gas into an initial fuel gas stream as an overhead fraction, and a carbon dioxide and sulfide stream as a bottom fraction, the expansion of the carbon dioxide and sulfide stream in an autorefrigeration cycle for the subcooling of the off-gas in the heat exchanger, and the recycling or exporting of said carbon dioxide and sulfides.

It is an object of the present invention to separate the carbon dioxide and sulfide containing components of the off-gas from the fuel containing components of said gas in a rectification column wherein the reflux of said column comprises a carbon dioxide stream which is condensed from the separated fuel stream by heat exchange with expanded and cooled carbon dioxide and sulfide gases.

It is an object of the present invention to separate the acid gas components of the off-gas from the fuel gas components of said off-gas by cooling and phase separation followed by the removal of residual sulfide components from the fuel gas by the action of a physical absorbent solvent.

It is an object of the present invention to utilize the subject process for the separation and recycling of the off-gas from an oil shale retorting operation.

It is an object of the present invention to utilize the subject process for the separation and recycling of the off-gas from a coal gasification operation.

It is a further object of the present invention to utilize the subject process for surface or in-situ retorting of coal and oil shale.

It is an object of the present invention to process a sulfur containing off-gas stream which contains 90% or more carbon dioxide.

It is an object of the present invention to separate and recycle off-gas from carbonaceous combustion retorts in a low energy, efficient manner.

It is an object of the present invention to alternately process high pressure off-gas streams without further compression as a step in the process of the subject invention.

It is also an object of the present invention to process the carbon dioxide containing off-gas from oxygen fireflooding or carbon dioxide miscible flood enhanced oil recovery to separate the carbon dioxide for recycle to injection in such processes or for delivery to other carbon dioxide utilizing processes.

DETAILED DESCRIPTION OF THE INVENTION

The present process is applicable to oil shale retorting, coal gasification, oxygen fireflooding and enhanced oil recovery. In the first two processes, which are of main concern to this invention, a heated gas is utilized to produce a fuel medium from a solid carbonaceous source. In the case of oil shale, the solid carbonaceous source is called kerogen. In the instance of coal, the solid carbonaceous source consists of various polynuclear aromatic ring compounds. The processes of oil shale retorting and coal gasification differ in the extent of combustion necessary for product fuel recovery. In oil shale retorting, an insubstantial amount of combustion is carried out in order to provide heat for the liquefaction and cracking of the constituents of the kerogen. However, in coal gasification, a substantial or nearly complete combustion and gasification is conducted in order to provide hydrogen and carbon monoxide fuel products from he aromatic constituents of the solid coal.

In both processes of main concern, a diluent gas is needed in order to control the combustion. In the case of oil shale, the combustion temperature is limited to avoid melting the mineral or non-kerogen portion of the shale and to avoid producing excessive energy consuming carbonate decomposition. In the case of coal gasification, the combustion is controlled in order to prevent the melting of coal ash to slag in the reaction zone. Steam has been utilized in the prior art as a diluent gas in both reactions. The use of carbon dioxide as a diluent gas has also been disclosed in the prior art. The present invention is concerned with the use of carbon dioxide gas as a diluent for oil shale retorting and coal gasification, and more specifically, it is concerned with the off-gas recovery of carbon dioxide for recycle to such reactions. In addition, sulfur compounds which are inherently in oil shale and coal minerals, are recouped from the off-gases from such reactions and reintroduced into their respective mineral formations for the deposition of the sulfur compounds on the combusted minerals to avoid subsequent air pollution or clean-up problems with respect to the disposition of such sulfur compounds.

In the description which follows, the processing of solid carbonaceous sources will be described as retorting, but this should not be construed as limited to oil shale retorting, but is meant to include the gasification of coal as well, which can also be gasified in a retort apparatus.

Figure 1:
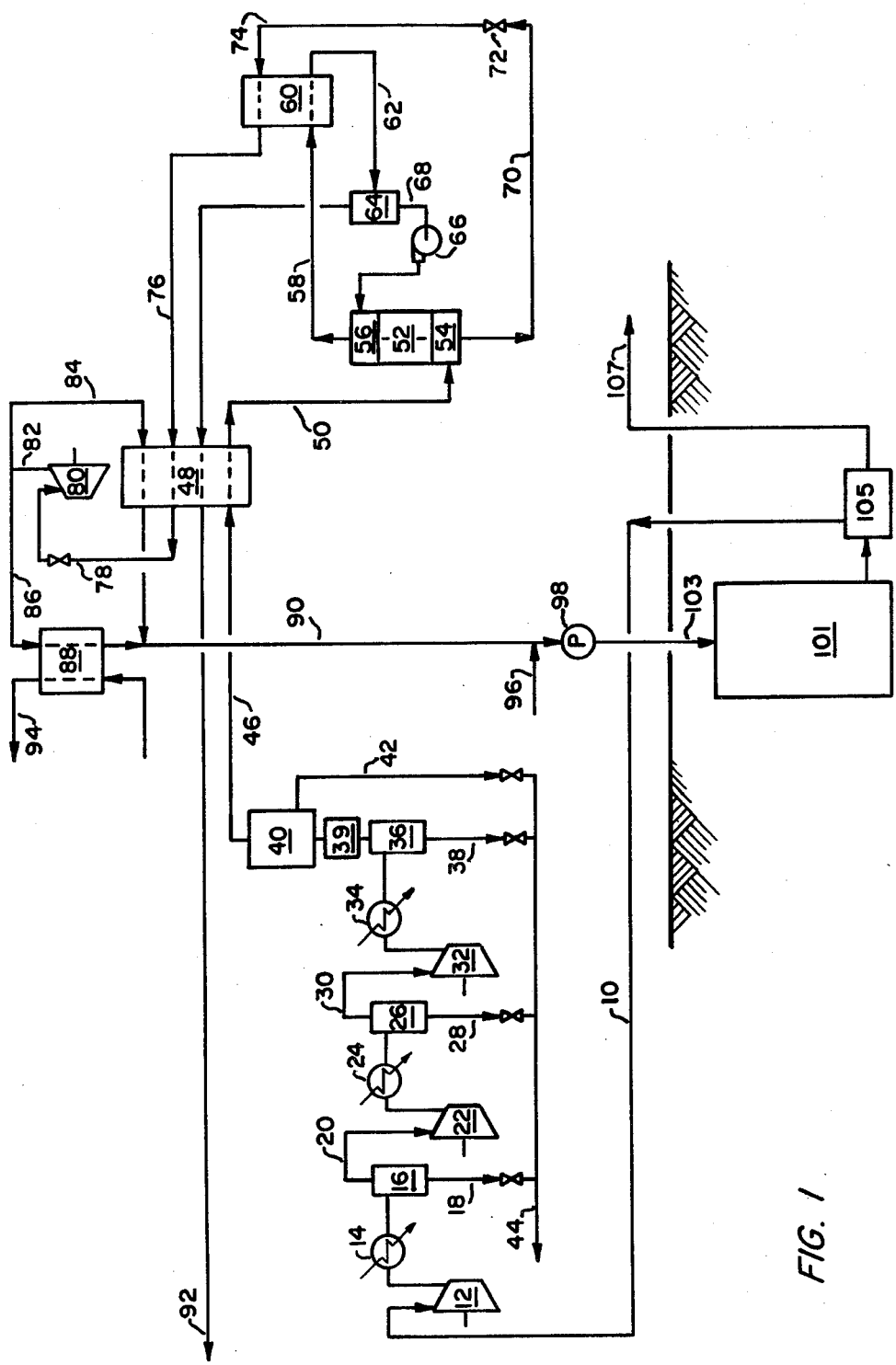
FIG. 1 is a flow sheet diagram of a first preferred embodiment of the present invention which utilizes a rectification column for separation.

The preferred embodiments of the present invention will be described with respect to oil shale retorting, but as indicated above, the applicable gas purification and recycling is appropriate for other similar off-gases from combustion processes, such as coal gasification, as well as non-combustion processes exemplified by enhanced oil recovery operations. As shown in FIG. 1, the retorting of an oil shale, here shown as an in-situ operation, is conducted by the mixture of an oxidant, such as air or oxygen, with a diluent gas such as carbon dioxide which has significant levels of impurities such as hydrogen sulfide and carbonyl sulfide and introduction of such a gas combination into the retort zone of the oil shale material. Combustion is initiated by an ignited fuel gas introduced into the oil shale reaction zone, but the sustained reaction is maintained by the introduction of the oxidant and diluent gas stream to burn residual char left on the retorted spent shale that produces hot combustion gases that pass downstream through fresh shale and heat it to retort it to produce and entrain oil vapor and combustible gases. As the hot gases and oil vapor move further downstream, they are cooled by fresh shale and the oil vapor condenses to liquid which is carried out of the retort with the gases. The liquid hydrocarbon fraction is separated from the off-gas consisting of carbon dioxide, a low BTU fuel component consisting of carbon monoxide, hydrogen and methane, some heavier hydrocarbons, as well as sulfur containing compounds from the oil shale such as hydrogen sulfide and carbonyl sulfide. It is these gases which are processed in the process flow scheme of the present invention.

The retort off-gases of an oxygen/carbon dioxide recycle system typically consist of the following carbonaceous gas composition and such a composition is used as exemplary of this process:

TABLE 1

| | |
|---|---|
| $CO_2$ | 91% |
| CO | 4.32% |
| $H_2$ | 2.5% |
| $C_x$ | 1.9% |
| $S_x$ | 0.33% |

The feed gas at the processing input has a flow rate of 6924 CFM. The retort off-gases are introduced in a line 10 at 38° C. and 14 psia into a multiple stage compression and aftercooling station consisting of compressors 12, 22 and 32 as well as cold water or refrigerant heat exchangers 14, 24 and 34. As the off-gas in line 10 is fed through the various stages of compression, it is aftercooled by the cold water heat exchangers. The gas is compressed to 161 psia at 38° C. The cold, compressed gas is then phase separated in multistage phase separators 16, 26 and 36. The liquid phases which are extracted in lines 18, 28 and 38 consist of moisture and hydrocarbons which can be removed through line 44. If the gases still contain significant levels of butane and higher boiling hydrocarbons at this point in the process, they will be removed at this time by absorption of such hydrocarbons in a suitable lean solvent system 39. Such systems are widely used to recover liquid petroleum gas (LPG) and natural gasoline and are well known by those skilled in the art. Therefore a brief outline of such an absorption system is deemed to be sufficient to describe this process step. In a lean solvent absorption system a lean oil, such as a gas-oil fraction boiling at 400°-600° F. is countercurrently contacted with the gas to be purified in a bubble column. The lean oil then rich in the desired hydrocarbons, generall $C_{4+}$, is then stripped by the action of reduced pressure, high temperatures and steam. The system is run in a cyclic manner and achieves the removal and recovery of $C_{4+}$ hydrocarbons from the carbon dioxide flowstream. The cool, compressed gas, substantially free of butane and higher hydrocarbons, is then fed to a drier 40 wherein residual moisture is removed in line 42. The drier can consist of several different types of moisture-removing apparatus, including: a methanol injection system, reversing paired absorbent columns charged with a desiccant such as alumina, reversing heat exchangers or reversing regenerators, all known in the prior art. The dried off-gas is then conducted through conduit 46 to the main heat exchanger 48. In exchanger 48, the off-gas stream in 46 is subcooled against product streams 76, 84 and 92. The gas is cooled to $-41.1°$ C. at 150 psia before being introduced into the rectification or distillation column 52. In the rectifying column, essentially all of the hydrogen sulfide, carbonyl sulfide and any contained propane are absorbed in a liquid carbon dioxide reflux to give an initial sulfur-free fuel gas stream as an overhead fraction. The fuel gas containing some carbon dioxide, but no sulfur, is removed as an overhead in line 58. It has a composition of: $CO_2$—90.4%, CO—4.6%, $H_2$—2.6%, $C_x$—2.4% and no sulfur. The stream is at $-42.2°$ C. and 148 psia and has a flow rate of 434.32 CFM. Carbon dioxide and essentially all of the sulfur containing compounds, such as hydrogen sulfide, carbonyl sulfide and any contained propane, are removed as a liquid bottom fraction from the lower most portion 54 of the column in line 70. The composition of this stream is: $CO_2$—99%, CO—0.1%, $C_x$—0.29%, S—0.46% at $-41.5°$ C. and 149 psia. At this point, the carbon dioxide and sulfide containing liquid stream is expanded through valve 72 to 80 psia at $-56°$ C. to provide cooling in line 74 for heat exchanger 60. The heat exchanger 60 cools the overhead fuel gas stream 58 from the rectifying column 52 by exchange with the cooled bottom stream 70 and 74. After this additional cooling to $-50°$ C., the fuel gas stream in line 62 is phase separated in separator 64. This provides a reflux stream 68 of essentially carbon dioxide which is introduced back into the column 52 as reflux by means of pump 66. The overhead from the separator 64 consists of the remaining fuel gas stream 92 which still contains the net amount of carbon dioxide produced in the retort after separating out the amount of carbon dioxide which has been recycled. This stream has a composition of: $CO_2$—70.5%, CO—14.8%, $H_2$—8.7%, and $C_x$—5.9%. The stream is essentially free of sulfur compounds. This stream 92 is then rewarmed to 29° C. in heat exchanger 48 against the incoming off-gas stream before being pipelined to an appropriate point at which it may be burned as medium to low BTU fuel gas or otherwise utilized, such as to produce hydrogen for upgrading the product shale oil. If insufficient carbon dioxide is present in column 52 to absorb all of the sulfur compounds entering the column in line 50, then carbon dioxide containing gases can be partially diverted from line 78 after they exit heat exchanger 48 and can be introduced into line 30 as additional compressor feed gas to compressor 32. This provides additional carbon dioxide to the column for absorbing sulfur compounds at the expense of increasing power requirements for compression. Alternately, the pressure of the column can be increased such that more sulfur compounds are absorbed in the same amount of carbon dioxide as flows through the system as shown.

The carbon dioxide and sulfide containing stream 70, which is removed from the bottom of the rectifying column 52 and expanded in valve 72 for cooling in heat exchanger 60, is then conducted in conduit 76 at $-49°$ C. through the main heat exchanger 48 where it is warmed against the incoming off-gas stream. The carbon dioxide and sulfide containing stream, now in conduit 78 at 29° C. and 70 psia, is cycled through an autorefrigeration loop consisting of an expander 80 and the connecting conduits that lead to the recycle line 90. As the expanded and cooled gas stream leaves expander 80 in conduit 82 at $-22°$ C. and 25 psia, it is split into a by-pass conduit 86 taking 89% of the flow and the refrigeration conduit 84 taking 11% of the flow. The latter conduit 84 conducts the stream through main heat exchanger 48 to provide additional refrigeration for the off-gas stream in line 46. A portion of the stream in line 82 is by-passed around the heat exchanger and is warmed against outside refrigeration in auxiliary heat exchanger 88. This export refrigeration in conduit 94 can be utilized for any refrigeration needs of the remainder of the process system in the retort or coal gasification project. Streams 86 and 84 are then rejoined as the recycle stream 90 to the retort. This stream contains carbon dioxide and essentially all of the hydrogen sulfide and carbonyl sulfide which was derived from the retort operation. The stream 90, at 29° C. and 20 psia, has a composition of: $CO_2$—99%, CO—0.1%, $C_x$—0.29% and S—0.46%. The stream has a return flow rate of 3453 CFM. The recycle stream 90 is blended with oxidant to be recharged into the retort zone. Generally, 10% oxidant in the form of oxygen is blended with 90% recycle gas, but a range of 10% to 18% oxidant can be used. The process provides an economic energy efficient method for the moderation of the retorting operation and the removal and deposition of sulfur compounds in a relatively inert carrier, namely, the spent retort material. In the operation described, it is important that stream 74 be maintained above about 75 psia, the triple point pressure of carbon dioxide, to avoid solid carbon dioxide formation and plugging problems. A throttle valve can be placed in line 78 to maintain the necessary back pressure.

For the process stream specified in Table 1, the net power for the autorefrigeration-separation process is 0.95 KWH/lb. mole of feed gas. This is chiefly compression requirements. Additional energy for drying would be at a maximum of 0.3 KWH/lb. mole of feed gas. The net power is the feed gas compression power reduced by the recovered expander power. Note however, that the amount of autorefrigeration available to the process by virtue of the Joule Thompson effect and the expander refrigeration is limited and is only adequate when the process is efficiently insulated to minimize heat leak using established cryogenic engineering practice. If insulation capability is reduced, permitting increased heat leak, additional refrigeration would have to be supplied from external sources to supplement the autorefrigeration. This would entail some increase in power requirements. Power requirements would be decreased when processing an off-gas already available at high pressure, and not requiring further compression.

Figure 2:
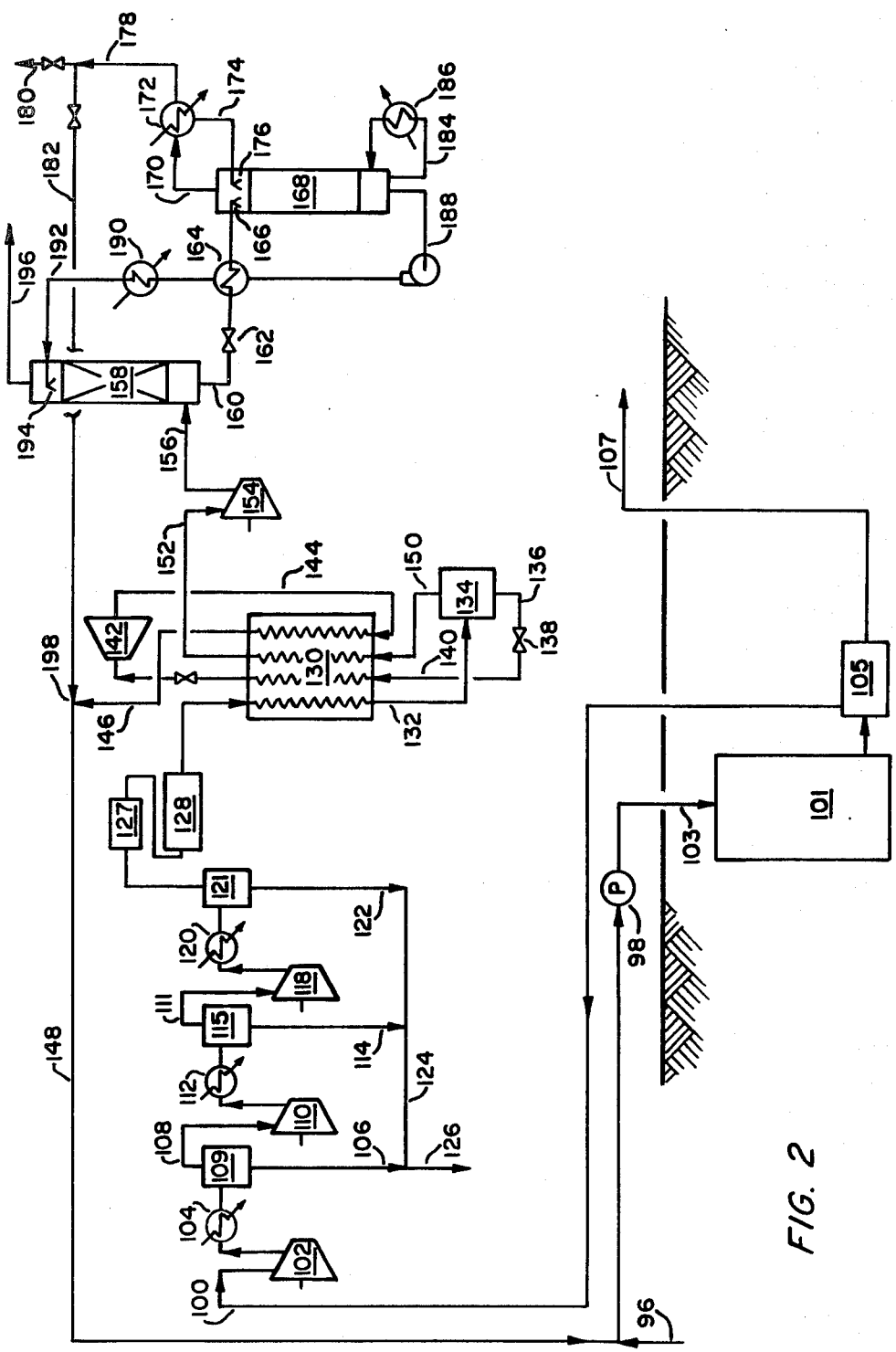
FIG. 2 shows a flow sheet diagram of a second preferred embodiment of the present invention which utilizes a separation tank and a physical absorbent solvent system

Alternately, the same objective of separating the carbonaceous off-gas into a fuel gas stream and a recycle diluent stream can be achieved in a variation of the same autorefrigeration cycle. As shown in FIG. 2, the off-gas which is separated from the kerogen derived oil of an oil shale retort or other off-gas producing operation is introduced by means of line 100 into a multistage compression and aftercooling process sub-step. The off-gas in conduit 100 is compressed in compressor 102 and cooled by cold water or refrigerant in heat exchanger 104. Water and hydrocarbons are condensed out of the gas stream in separator 109 through conduit 106. The off-gas stream is further compressed in compressor 110 fed by conduit 108. The compressed gas is again aftercooled in heat exchanger 112 against cold water or a refrigerant source and additional moisture and hydrocarbons are removed by separator 115 through line 114. The off-gas is conducted through conduit 111 into the final compressor 118 and again cooled in aftercooler 120 against cold water or a refrigerant to further remove moisture and hydrocarbons by separator 121 in line 122. The moisture and hydrocarbons from lines 106, 114 and 122 are collected in line 124 and discharged through line 126. If the off-gas contains significant levels of butane and higher boiling hydrocarbons, they will be removed in a lean solvent absorption system 127.

The dry and compressed off-gas is then conducted through a final drier unit 128, which as in the above preferred embodiment can consist of a methanol injection system, or a pair of switching desiccant-loaded drying beds charged with a desiccant such as alumina. At this point, the residual moisture is removed from the off-gas stream, and it is subcooled in heat exhanger 130 against the various product streams. The subcooled off-gas in line 132 is then subjected to a phase separation in separation vessel 134. A sulfur containing fuel stream is removed as an overhead fraction in conduit 150 and is rewarmed in heat exchanger 130. Similarly, an initial carbon dioxide and sulfide containing liquid stream is removed as a bottom fraction in line 136 and is expanded through valve 138 to provide cooling for heat exchanger 130 in conduit 140. The stream in line 140 is further cooled and expanded in expander turbine 142 before being reintroduced into heat exchanger 130 by means of conduit 144. Lines 140, 144 and 150 supply the cooling effect in heat exchanger 130 which is necessary to subcool the off-gas stream in line 132.

The rewarmed residual sulfur containing fuel gas stream in line 152 is then further compressed in compressor 154 before being introduced via line 156 into an absorbent tower 158. The gas stream is countercurrently contacted with a physical absorbent solvent, such as methanol, N-methyl-2-pyrrolidone, dimethyl ethers of polyethylene glycol, propylene carbonate or sulfolane, in the column 158. All of the residual sulfur compounds are scrubbed from the fuel gas in this countercurrent contact with a physical absorbent solvent. An essentially sulfur-free medium to low BTU fuel gas is removed as an overhead in line 196 and is acceptable for use as a combustion fuel either in the present process or as an export fuel or is available for other uses, such as hydrogen generation. The physical absorbent solvent containing the sulfur compounds and residual carbon dioxide is removed as a liquid bottom stream in line 160 from the column 158. The pressure is decreased on this solvent stream in valve 162 and the low pressure stream is heat exchanged in exchanger 164 prior to being introduced as the feed into a distillation column 168 for regeneration. The column 168 is refluxed and reboiled by refrigeration and heat circuits which are exchanged against cold and warm external streams, respectively, such as cooling water and heated water. The sulfur containing compounds, such as hydrogen sulfide and carbonyl sulfide, as well as carbon dioxide are removed as an overhead fraction in line 170, and this overhead stream is cooled in heat exchanger 172 to knock out a carbon dioxide and solvent flow in line 174. The remaining gaseous sulfide and carbon dioxide stream in line 178 can be directed to a Claus plant for production of elemental sulfur in line 180 or can be reintroduced in line 182 to the initially separated recycle stream in line 146. If this option is chosen, the sulfide containing stream is introduced into line 146 via junction 198, and the combined streams are recycled to the oil shale retort operation by line 148. In this manner as in the previous embodiment, a portion of the carbon dioxide and essentially all of the sulfide containing compounds are recycled to the retort in a blend with the oxidant gas so as to control the combustion which occurs in the retort and to deposit the noxious sulfide compounds on the spent retort material, namely the oil shale particles which have been depleted of their kerogen content.

The bottom portion of the distillation column 168 is reboiled by a recycling stream 184 which is heat exchanged with a warming heat source such as steam. The lean physical absorbent solvent which is essentially free of the sulfide compounds is then recycled through line 188 and heat exchanged with the incoming stream in line 160 before being cooled against a cold water or refrigeration source in heat exchanger 190 and introduced into the scrubbing column 158 via line 192 and distribution head 194.

The physical absorbent which consists of an organic solvent is preferably methanol, but a number of other organic solvents which operate as physical absorbents can be used with similar but less productive results, including: N-methyl-2-pyrrolidone, dialkyl ethers of polyethylene glycol, propylene carbonate and sulfolane.

Both of the embodiments described and set forth above provide for a low cost energy efficient method for the control of oil shale retorting and coal gasification operations. In addition, the method provides an expedient manner in which to deal with the sulfide pollution problem. It has been found, as documented by the prior art, that the sulfides of such reactions are readily absorbed by the spent oil shale or the coal ash and are contained therein to provide a safe environmentally acceptable disposition of such sulfide contaminants. The process as described does not require the use of scarce resources such as water or expensive chemical solvents with their attendant regeneration requirements.

Alternately the separation schemes of FIG. 1 or FIG. 2 can be used to process $CO_2$ containing off-gases from oxygen fireflooding or $CO_2$ miscible flood enhanced oil recovery operations. In that event, stream 90 of FIG. 1 or stream 148 of FIG. 2 can send $CO_2$ to other $CO_2$ utilizing processes.

The preferred embodiments have been set forth above, but it is understood that various modifications can be made without deviating from the scope of the invention, such as the use of additional or fewer compressors and aftercoolers in the initial treatment of the off-gas stream or in the amount of auto refrigeration which is provided to the heat exchangers in the process, or whether the autorefrigeration might be supplemented with some conventional refrigeration system.

Rather, the scope of the invention should be determined by the claims which are set forth below.

We claim:

1. A process for separating a carbonaceous off-gas containing acid gases, such as: carbon dioxide, hydrogen sulfide and carbonyl sulfide by separating said off-gas into an essentially sulfur-free fuel gas and a sulfur containing acid gas stream, comprising the steps of:
    (a) compressing and after cooling an off-gas from an off-gas producing operation;
    (b) removing any butane and higher boiling hydrocarbons from the off-gas of step (a) by absorption in lean solvent and drying the compressed and cooled off-gas to remove moisture from said gas;
    (c) cooling the off-gas from step (b) against product gas streams in a heat exchanger;
    (d) separating the cooled off-gas in a rectifying column without the use of an external solvent into an initial sulfur-free fuel gas stream as an overhead fraction and a carbon dioxide and sulfide stream as a bottom liquid fraction;
    (e) expanding the initial carbon dioxide and sulfide stream in order to cool by autorefrigeration the initial fuel stream in a heat exchanger;
    (f) separating said cooled fuel stream into a final sulfur-free fuel stream and a sulfur-free reflux stream that is reintroduced into the head of the rectifying column;
    (g) further expanding the carbon dioxide and sulfide stream in an autorefrigeration cycle to provide additional refrigeration for the cooling of the off-gas in the heat exchanger of step (c);
    (h) sending said $CO_2$ and sulfides to a carbon dioxide utilizing process.

2. The process of claim 1 wherein the $CO_2$ and sulfide product stream of step (h) is recycled to the operation from which the feed off-gas was derived.

3. The process of claim 1 wherein the autorefrigeration is supplemented by refrigeration from an external source.

4. A process for separating a carbonaceous off-gas containing acid gases, such as; carbon dioxide, hydrogen sulfide and carbonyl sulfide by separating said off-gas into an essentially sulfur-free fuel gas and an acid gas stream, comprising the steps of:
    (a) compressing and aftercooling an off-gas from an off-gas producing operation;
    (b) removing any butane and higher boiling hydrocarbons by absorption in lean solvent and drying the compressed and cooled off-gas to remove moisture from said gas;
    (c) subcooling the off-gas against product gas streams in a heat exchanger;
    (d) separating the subcooled off-gas into an initial fuel gas stream as an overhead fraction and an initial $CO_2$ and sulfide liquid stream as a bottom fraction;
    (e) expanding the $CO_2$ and sulfide liquid stream in an auto-refrigeration cycle for the subcooling of the off-gas in the heat exchanger of step (c);
    (f) extracting residual sulfides from the fuel gas stream by contact of the stream with a physical absorbent solvent which has a greater absorptivity for sulfides than for CO, $CO_2$, fuel hydrogen or fuel hydrocarbons;
    (g) regenerating the physical solvent in a distillation column to recycle lean physical absorbent solvent to the extraction step of (f) and to produce a second $CO_2$ and sulfide stream;
    (h) sending said expanded $CO_2$ and sulfides of step (e) to a carbon dioxide utilizing process.

5. The process of claim 4 wherein the second $CO_2$ and sulfide stream is introduced into the initial expanded $CO_2$ and sulfide stream to provide a combined $CO_2$ product stream.

6. The process of claim 4 wherein the second $CO_2$ and sufide stream is used as a feed to a Claus plant operation for the recovery of elemental sulfur.

7. The process of claim 4, 5 or 6 wherein the physical absorbent solvent is selected from the group comprising N-methyl-2-pyrrolidone, dimethyl ethers of polyethylene glycol, methanol, propylene carbonate and sulfolane.

8. The process of claim 4 wherein the expanded $CO_2$ and sulfide stream of step (h) is recycled to the operation from which the feed off-gas was derived.

9. A process for separating a high pressure carbon dioxide off-gas containing acid gases, such as carbon dioxide, hydrogen sulfide and carbonyl sulfide by separating said off-gas into an essentially sulfur-free fuel gas and a sulfur containing acid gas stream for introduction to a carbon dioxide utilizing process, comprising the steps of:
    (a) cooling a high pressure off-gas against process product streams in a heat exchanger;
    (b) separating the cooled off-gas of step (a) in a rectifying column without the use of an external solvent into an initial sulfur-free fuel gas stream as an overhead fraction and a carbon dioxide and sulfide stream as a bottom liquid fraction;
    (c) expanding the carbon dioxide and sulfide stream in order to cool by autorefrigeration the initial fuel stream in a heat exchanger;
    (d) separating said cooled fuel stream into a final sulfur-free fuel stream and a sulfur-free reflux stream that is reintroduced into the head of the rectifying column;
    (e) further expanding the carbon dioxide and sulfide stream in an autorefrigeration cycle to provide additional refrigeration for the cooling of the off-gas in the heat exchanger of step (a);
    (f) sending said $CO_2$ and sulfides to a carbon dioxide utilizing process.

10. The process of claim 9 wherein the $CO_2$ and sulfide stream of step (g) is recycled to the operation from which the feed off-gas was derived.

11. The process of claim 1, 4, 9, 2, 8 or 10 wherein the off-gas is derived from an oil shale retort operation.

12. The process of claim 1, 4, 9, 2, 8 or 10 wherein the off-gas is derived from a coal gasification operation.

13. The process of claim 1, 4, 9, 2, 8 or 10 wherein the off-gas is derived from a $CO_2$ miscible flood enhanced oil recovery operation.

14. The process of claim 1, 4 or 9 wherein the off-gas is derived from an oxygen fireflooding operation.

15. The process of claims 1, 4 or 9 wherein the $CO_2$ and sulfide stream is expanded in an expander turbine to generate auto refrigeration and power.

16. The process of claim 9 wherein the high pressure off-gas is dried to remove moisture therefrom before cooling said gas.

17. The process of claim 9 wherein the high pressure off-gas is initially introduced into a lean solvent sorption system to remove any butane and higher boiling hydrocarbons from said off-gas before cooling said gas.

18. The process of claim 17 wherein the high pressure off-gas is dried to remove moisture therefrom after the initial removal of butane and higher boiling hydrocarbons is performed.

19. The process of claim 9 wherein the autorefrigeration is supplemented by refrigeration from an external source.

20. A process for recycling a portion of an oil shale retort off-gas containing acid gases, such as; carbon dioxide, hydrogen sulfide and carbonyl sulfide by separating said off-gas into an essentially sulfur-free fuel gas and a sulfur-containing acid gas stream for recycle to an oil shale retort, comprising the steps of:

(a) compressing and aftercooling said off-gas from an oil shale retort operation;

(b) removing any butane and higher boiling hydrocarbons from the off-gas of step (a) by absorption in lean solvent and drying the compressed and cooled off-gas to remove moisture;

(c) cooling the off-gas from step (b) against product gas streams in a heat exchanger;

(d) separating the cooled off-gas in a rectifying column without the use of an external solvent to remove an initial sulfur-free fuel gas stream as an overhead fraction and an initial carbon dioxide and sulfide stream as a bottom fraction;

(e) expanding the initial carbon dioxide and sulfide stream in order to cool by autorefrigeration the initial fuel stream in a heat exchanger;

(f) separating said cooled fuel stream into a final sulfur-free fuel stream and a sulfur-free reflux stream that is reintroduced into the head of the rectifying column;

(g) further rewarming and expanding the carbon dioxide and sulfide stream in an expander turbine to provide autorefrigeration to provide additional refrigeration for the cooling of the off-gases in the heat exchanger of step (c);

(h) recycling said $CO_2$ and sulfide stream to an oil shale retort.

21. The process of claim 1, 4 or 20 in which the compression and after cooling of the off-gas is conducted in multiple stages.

22. The process of claim 20 wherein the feed off-gas comprises 90% or greater of carbon dioxide with the remaining composition comprising fuel components and sulfides.

23. The process of claim 20 wherein the autorefrigeration is supplemented by refrigeration from an external source.

* * * * *